(12) United States Patent
Alapuranen

(10) Patent No.: US 7,742,446 B2
(45) Date of Patent: Jun. 22, 2010

(54) SYSTEM AND METHOD FOR PERFORMING DISTRIBUTED SIGNAL CLASSIFICATION FOR A MULTI-HOP COGNITIVE COMMUNICATION DEVICE

(75) Inventor: Pertti O. Alapuranen, Deltona, FL (US)

(73) Assignee: MeshNetworks, Inc., Maitland, FL (US)

( * ) Notice: Subject to any disclaimer, the term of this patent is extended or adjusted under 35 U.S.C. 154(b) by 838 days.

(21) Appl. No.: 11/252,097

(22) Filed: Oct. 17, 2005

(65) Prior Publication Data

US 2007/0086396 A1 Apr. 19, 2007

(51) Int. Cl.
*H04W 4/00* (2009.01)
(52) U.S. Cl. .................... 370/328; 370/332; 370/338
(58) Field of Classification Search ............ 370/328, 370/332, 338

See application file for complete search history.

(56) References Cited

U.S. PATENT DOCUMENTS

| | | | |
|---|---|---|---|
| 6,246,985 B1* | 6/2001 | Kanevsky et al. | 704/270 |
| 7,035,240 B1* | 4/2006 | Balakrishnan et al. | 370/338 |
| 2004/0047324 A1* | 3/2004 | Diener | 370/338 |
| 2005/0239411 A1* | 10/2005 | Hazra et al. | 455/67.11 |
| 2005/0266808 A1* | 12/2005 | Reunamaki et al. | 455/101 |
| 2006/0128311 A1* | 6/2006 | Tesfai | 455/67.11 |

* cited by examiner

*Primary Examiner*—Vincent P Harper
*Assistant Examiner*—Marisol Figueroa
(74) *Attorney, Agent, or Firm*—Randi L. Karpinia; Joseph J. Buczynski

(57) ABSTRACT

A system and method for cognitive communication device operation. In accordance with the system and method, a node (102, 106, 107) that communicates in a wireless multihopping communication network (100) uses a receiver (302, 402, 502, 602) to acquire a digital sample of a communication signal, and extracts at least one feature of the digital sample. The node (102, 106, 107) employs a classifier (306, 406, 506) to determine the signal type, and a transmitter (108) to send feature vectors including information representing the signal type to other nodes (102, 106, 107) in the network (100).

23 Claims, 8 Drawing Sheets

SYSTEM AND METHOD FOR PERFORMING DISTRIBUTED SIGNAL CLASSIFICATION FOR A MULTI-HOP COGNITIVE COMMUNICATION DEVICE

FIELD OF THE INVENTION

The present invention relates generally to wireless communication networks, and, more particularly, to a system and method for cognitive communication device operation in a multi-hop wireless network.

BACKGROUND

As understood in the art, a cognitive radio is a communication device that is capable of wireless communication in a network, and is also able to change its communication parameters to adapt to a changing communication environment. Notice of Proposed Rulemaking and Order Federal Communications Commission (FCC) 03-322 explains the concept of interruptible spectrum leasing. This type of operation allows for licensing that can be suspended when the spectrum is needed for some urgent reason, such as, for example, emergency operations. The FCC also expects that cognitive radio technologies can identify spectrum that is available for leased use and ensure that the spectrum reverts to the license under predetermined conditions.

One of the techniques for accomplishing access/reversion is to employ handshaking. This technique expects the radio systems to be compatible, that is, able to communicate with each other. Another technique permits a secondary licensee device to operate only if the secondary licensee can verify by handshaking that the device can operate on the frequency. A further technique requires the secondary licensee to cease operations when the secondary licensee receives signaling information from the primary licensee system to stop operating. In a beacon system, as known in the art, the secondary licensee receives a beacon indicating that operations are allowed.

The methods described by FCC 03-322 are critical for suspending secondary licensee operation when spectrum is required for important use. Further, other conditions exist where cognitive radio technologies may be useful, such as when it is desirable to modify the transmission method depending on interference.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
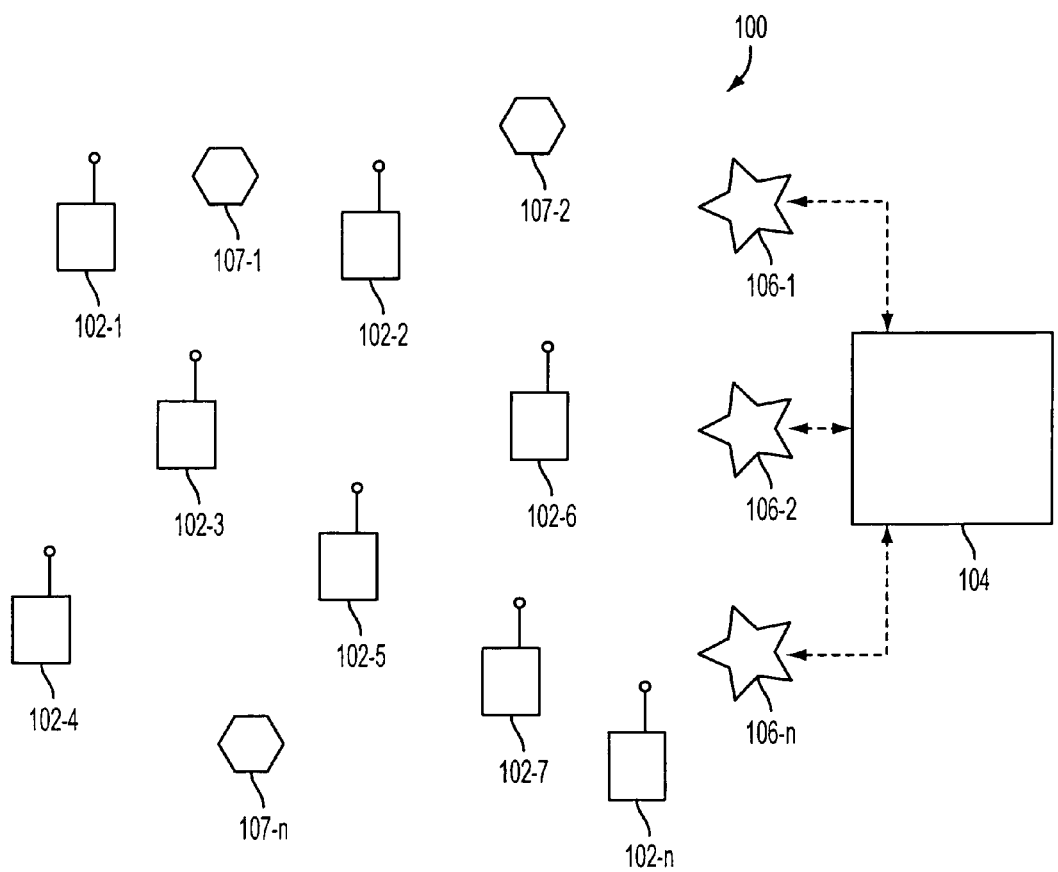
FIG. 1 is a block diagram of an example ad-hoc wireless communications network including a plurality of nodes employing a system and method in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a system and method for performing distributed signal classification for a multi-hop communication device. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a system and method for performing distributed signal classification for a multi-hop cognitive communication device. as described herein. The non-processor circuits may include, but are not limited to, a radio receiver, a radio transmitter, signal drivers, clock circuits, power source circuits, and user input devices. As such, these functions may be interpreted as steps of a method for performing distributed signal classification for a multi-hop cognitive communication device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

As discussed in more detail below, the present invention provides a system and method for improving cognitive communication device operation. In accordance with the system and method, a node that communicates in a wireless multi-hopping communication network uses a receiver to acquire a digital sample of a communication signal, and extracts at least one feature of the digital sample. The node employs a classifier to determine the signal type, and a transmitter to send feature vectors including information representing the signal type to other nodes in the network.

In recent years, a type of mobile communications network known as an ad-hoc network has been developed. In this type of network, each mobile node is capable of operating as a base station or router for the other mobile nodes, thus eliminating the need for a fixed infrastructure of base stations. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, now U.S. Pat. No. 7,072,650 B2, in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, now U.S. Pat. No. 6,807,165, and in U.S. patent application Ser. No. 09/815,164 entitled "Prioritized-Routing for an Ad-Hoc, Peer-to-Peer, Mobile Radio Access System", filed on Mar. 22, 2001, now U.S. Pat. No. 6,873,839, the entire content of each being incorporated herein by reference.

FIG. 1 is a block diagram illustrating an example of an ad-hoc multi-hopping wireless communications network 100 employing an embodiment of the present invention. Specifically, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, ... 106-n (referred to generally as nodes 106, access points 106 or intelligent access points (IAPs)), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107 or fixed routers 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. Nos. 7,072,650 B2, 6,807,165, and 6,873,839, referenced above.

Figure 2:
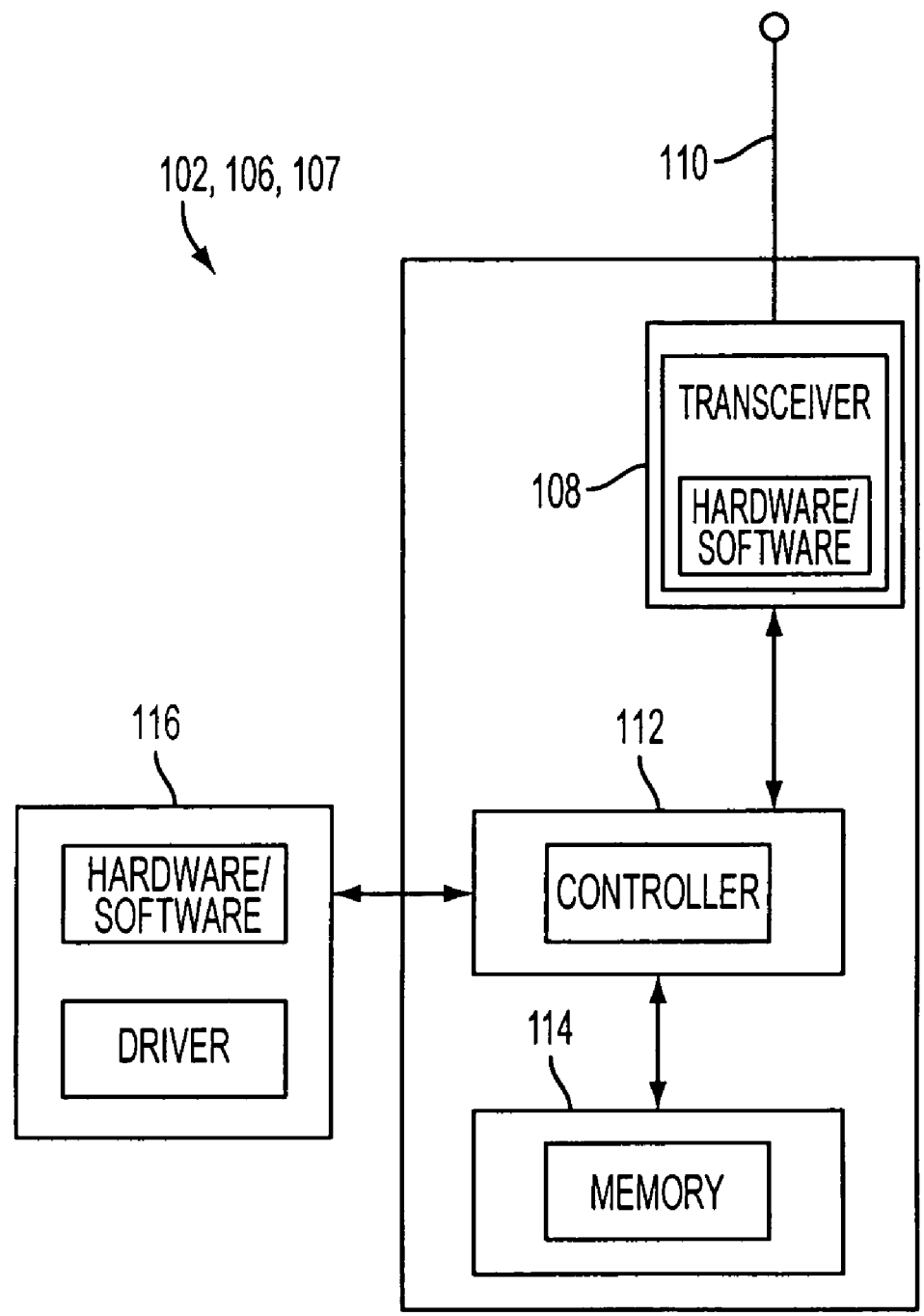
FIG. 2 is a block diagram illustrating an example of a mobile node employed in the network shown in FIG. 1.

As shown in FIG. 2, each node 102, 106 and 107 includes a transceiver, or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

As can be appreciated by one skilled in the art, multiple networks operating in a single band can render both networks inoperative if their transmissions are not properly coordinated. For this reason traditionally only one network is used in a certain frequency band. The Federal Communication Commission (FCC) rules for ISM (industrial, scientific, and medical) bands are changing this traditional frequency band use, and currently, some frequency bands have multiple incompatible networks operating on those bands. Networks interfere with each other unnecessarily because they are not able to identify other networks using the same spectrum and then modify their transmission system to handle the situation properly. The FCC ISM rules originally used spread spectrum and frequency hopping in an attempt to make sure some level of co-existence is possible together with strict power limits.

Some of the interoperation problems can be solved by adding a signal classifier and adaptive modulation to a node of a network. The signal classifier receives signals from other networks and classifies the networks into known and unknown networks. Known networks are networks that can be recognized, for example, networks operating in compliance with the Institute of Electrical and Electronic Engineers (IEEE) Standards 802.11b or 802.11g transmissions.

Unknown networks may be transmissions that are unintentional, intentional interference, or networks that did not exist at the time the signal classifier was developed.

Signal Classifier System

Figure 3:
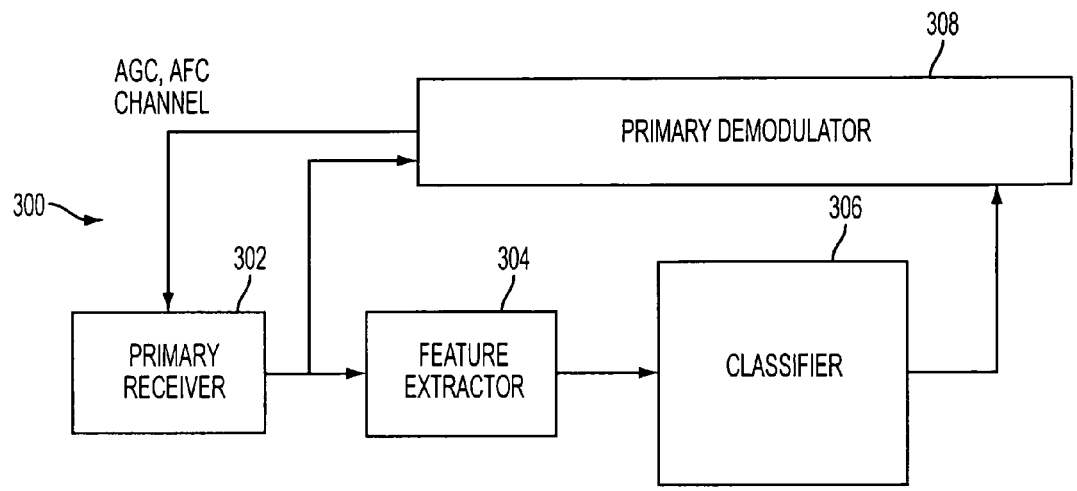
FIG. 3 is a block diagram illustrating an example of a signal classifier system in accordance with an embodiment of the present invention.

An example of a signal classifier system 300 according to an embodiment of the present invention, that can be employed in any of the nodes 102, 106 or 107 of the network shown in FIG. 3, generally comprises a receiver 302, a feature extraction component 304, a classifier 306 and a demodulator 308, as shown in FIG. 3. The receiver 302 and demodulator 308 typically can be employed in the transceiver 108 of a node 102, 106 or 107, or be separate components, while the feature extraction component 304 and classifier 306 can be employed in the controller 112 and its associated hardware and software, or as separate components. The receiver 302 can be, for example, a narrowband or wideband receiver that samples the frequency band at least at the Nyquist rate (the lowest sampling rate that will permit accurate reconstruction of a sampled analog signal) and sends the samples to a feature extraction module 304. A simple implementation of this type of receiver 302 is a receiver comprising an analog to digital (A/D) converter. The dynamic range of the A/D converter depends on the bandwidth and required sensitivity for the classifier system 300. The classifier system 300 monitors the frequency bands periodically, with the period being programmable and typically dependent upon the use of the band. The demodulator 308 can perform automatic gain control (AGC) and automatic frequency control (AFC) operations on the receiver 302 as can be appreciated by one skilled in the art.

The operations of the receiver 302, feature extractor 304 and classifier 306 will now be described in more detail.

Receiver

The receiver 302 of the signal classifier system 300 acquires digital samples representing the received signals in the monitored band. This can be done in accordance with one of four methods:

1) When the primary receiver 302 is receiving, samples are passed to the signal classifier 306 via the feature extractor 304.
2) When the primary receiver 302 is neither receiving nor transmitting in the monitored band, samples are passed to the demodulator 308 for monitoring.
3) An additional receiver or split Multiple-Input Multiple-Output (MIMO) receiver can be used when the station is not transmitting.
4) An additional receiver or split MIMO can be used to monitor bands that are outside the current transmission frequency band.

Method 1 can have efficiency issues due to the limited dynamic range of reasonable A/D converters that can be employed in the receiver 302. The dynamic range of the signals can be in the range of ten (10) to eighty (80) decibels (dBs), which may be more than what can be reasonably be built with fast A/D converters. The signal classifier system might not be able to scan other channels as the receiver is used for primary communications all the time.

Figure 4:
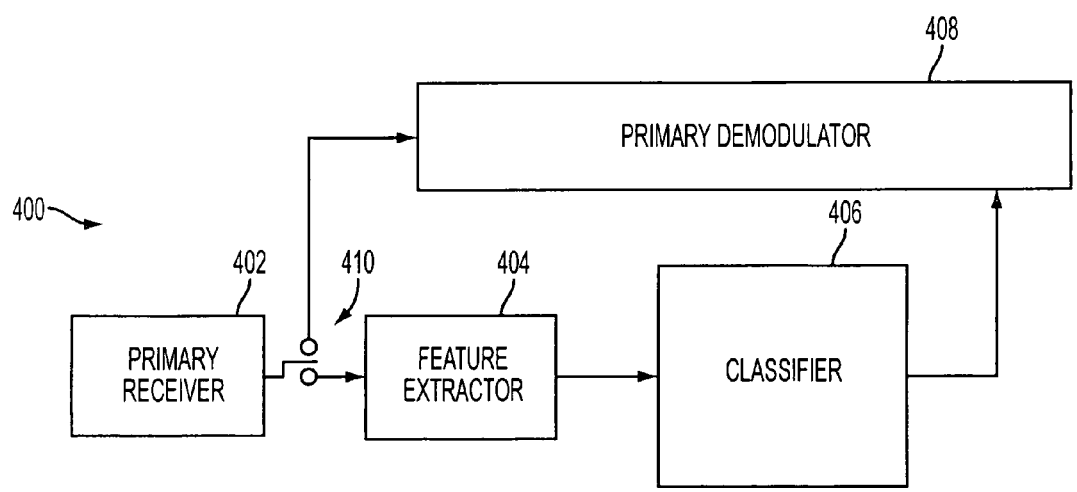
FIG. 4 is a block diagram illustrating another arrangement of signal classifier system in accordance with an embodiment of the present invention.

Method 2 operates such that when the controller 112, for example, of a node 102, 106 or 107 determines that signals from its own network 100 are not present, then the demodulator 308 can control the AGC of the receiver 302 so that the receiver 302 can monitor signals from other networks that are using the same band. The receiver 302 can, for example, be adjusted to high gain between the short periods between data packets. FIG. 4 illustrates a signal classifier system 400 similar to the signal classifier system 300 as shown in FIG. 3 in that the signal classifier system 400 employs a receiver 402, feature extraction component 404, a classifier 406 and a demodulator 408 identical to those components discussed above with regard to FIG. 3. However, signal classifier system 400 further employs a switch 410 that can send the samples of the signals from the other networks to the demodulator 308 instead of the feature extractor 304 and classifier 306.

Figure 5:
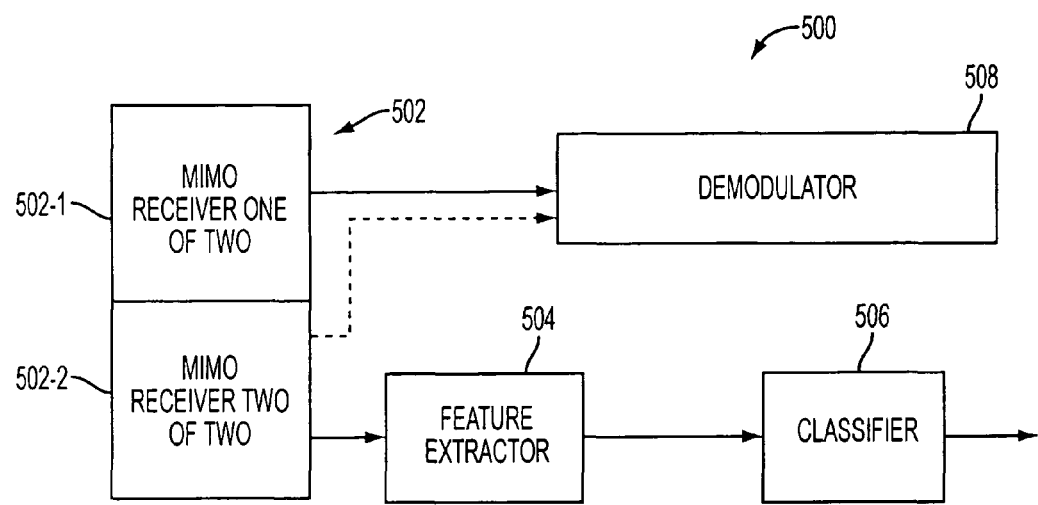
FIG. 5 is a block diagram illustrating a further arrangement of a signal classifier system in accordance with an embodiment of the present invention.

In method 3, the bandwidth of the receiver 302 or 402 may be adjustable by front end filtering, which also affects the sensitivity. The main receiver 302 or 402 may still be operational for detecting the primary communications because the method can use an additional receiver as shown in FIG. 5. That is, the signal classifier system 500 can comprise a receiver 502 that is configured as a plurality of Multiple-Input Multiple-Output (MIMO) receivers (i.e., split MIMO communication devices) 502-1 and 502-2 so that individual receivers whose MIMO capability is not required may be used for monitoring other secondary frequency bands. FIG. 5 specifically illustrates receiver 502 as a two by two (2×2) MIMO receiver. The signal classifier system 500 is similar to signal classifier systems 300 and 400 discussed above in that signal classifier system 500 comprises a feature extraction component 504, a classifier 506 and a demodulator 508. The dashed lines show the normal operation where both of the two receivers 502-1 and 502-2 are being used at the same time. However, during cognitive communication device operation, the receiver signals from one receiver (e.g., receiver 502-2) are sent to the feature extractor 504 as indicated by the solid line. This type of configuration can use the MIMO capabilities when needed and can perform signal classification when needed. AGC adjustment is therefore not required, and signal classification can be improved because this arrangement reduces the effect of spectral leakage that can occur due to the transmission of a signal by the transceiver of the node 102, 106 or 107 in a frequency band neighboring the frequency band of the received signal.

Method 4 allows the monitoring receiver 302, 402 or 502 to move across multiple frequency bands easily and operate even while the transmitter of the transceiver 108 the node 102, 106 or 107 is active if the frequency band is sufficiently far apart in frequency. Naturally, the additional receiver (e.g., receiver 502-2 as shown in FIG. 5) can comprise multiple receivers that are set at individual frequency bands that are monitored simultaneously.

Figure 6:
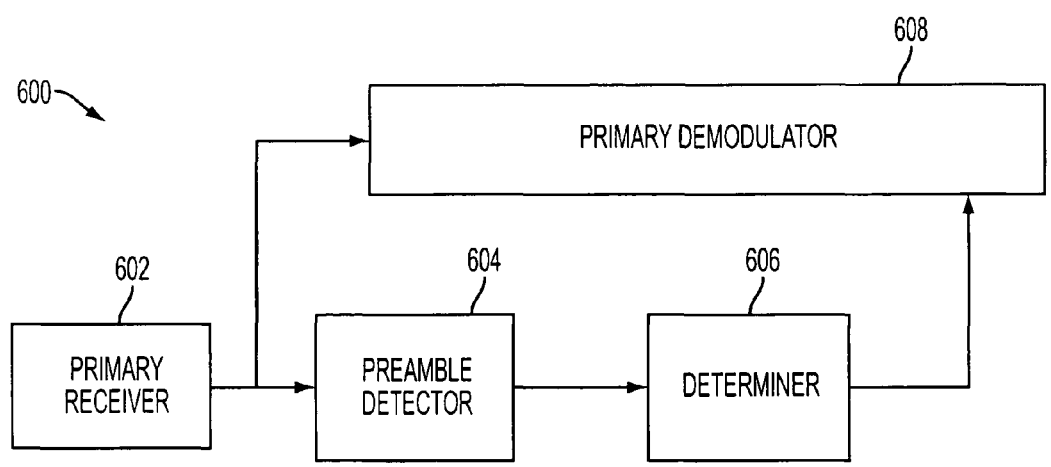
FIG. 6 is a block diagram illustrating another arrangement of a signal classifier system in accordance with an embodiment of the present invention.

In additional to the above four methods, the multiple receiver signal classifier system 300, 400 or 500 can also identify a preamble or some other signal that identifies known transmissions in a monitored frequency band. That is, as shown in FIG. 6, the signal classifier system 600 similar to signal classifier systems 300, 400 and 500 as discussed above can include receiver 602, a preamble detector 604 and a determiner 606 which, in response to the preamble of the signal, can provide an indication to the receiver 602 to stop operating in the monitored frequency band and use some other band for communications. The signal classifier system 600 further comprises a primary demodulator 608 similar to those discussed above.

Feature Extractor

As discussed briefly above, the feature extraction component 304, 404 or 504 takes measurements of the sample stream. Such measurements include, for example, at least one of the following: a Fourier transform; average signal power; detection of IEEE 802.11 Media Access Control (MAC) headers by a delay and correlate algorithm; and location of the receiver.

Figure 7:
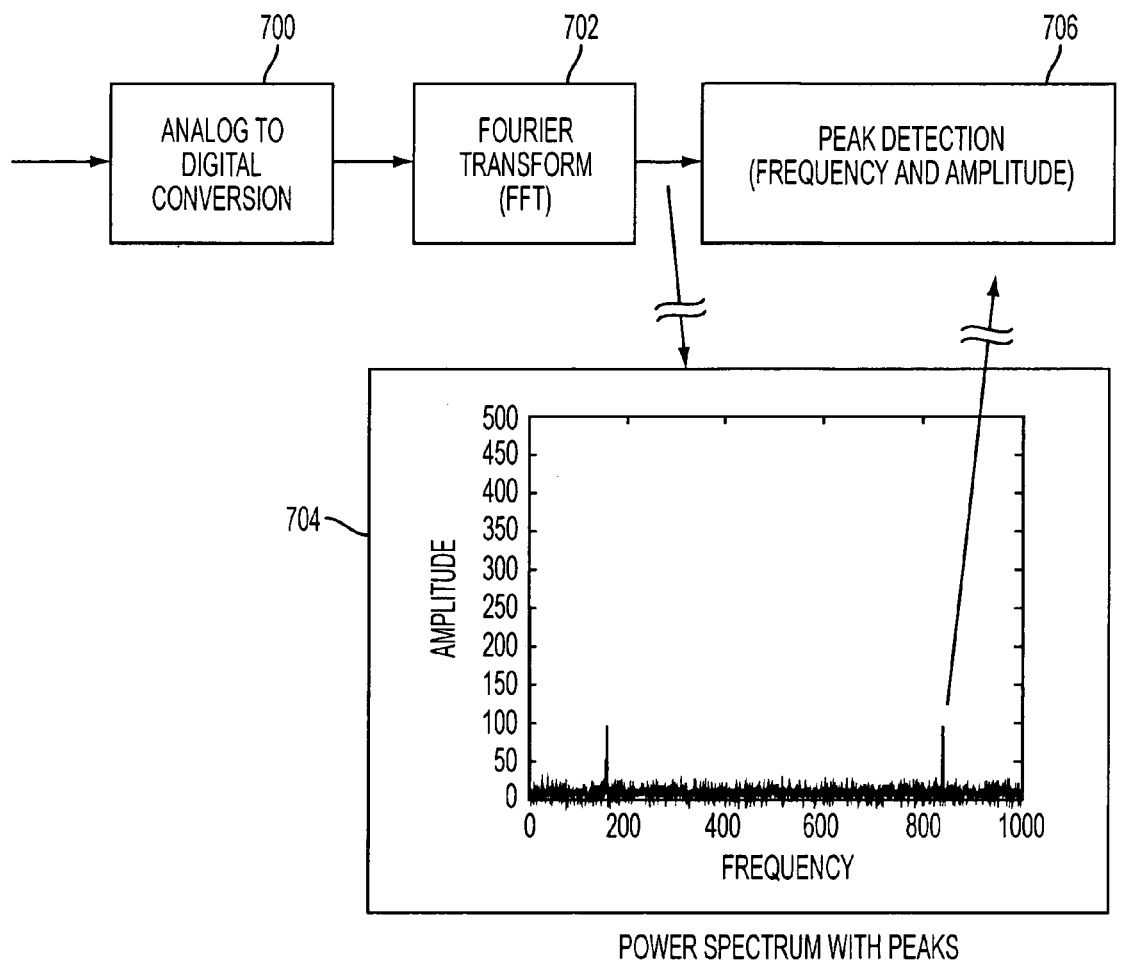
FIG. 7 is a conceptual block diagram illustrating and example of amplitude and frequency of peaks in a Fast Fourier Transform of an input signal.

For example, an FFT (Fast Fourier Transform) output can be averaged over a large number of samples and the peaks from the spectrum can be identified by their amplitude and frequency as shown in FIG. 7. This can be used to detect single carrier transmissions. FIG. 7 specifically illustrates that the feature extraction component 304, 404 or 504 performs an analog to digital conversion 700 and provides an FFT output 702 that is shown graphically as 704. The feature extraction component performs a peak detection operation 706 as shown.

Figure 8:
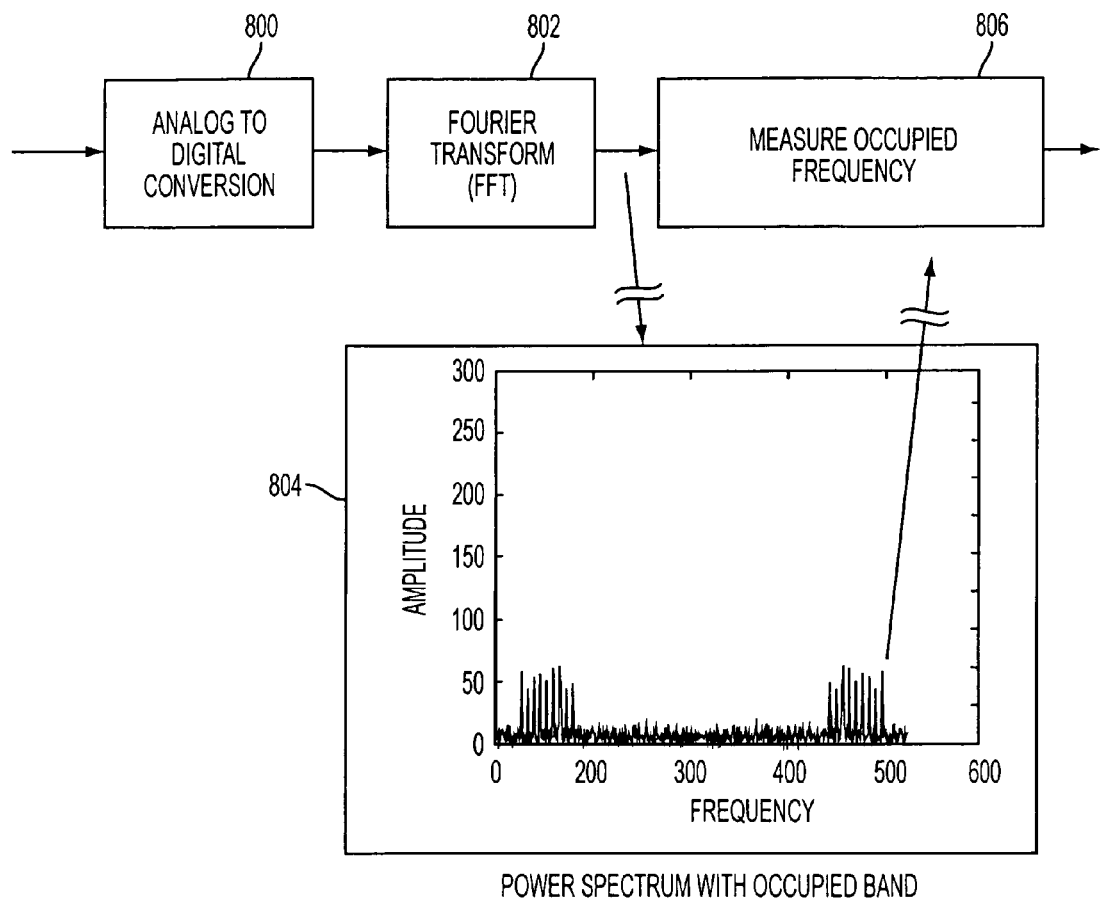
FIG. 8 is a conceptual block diagram illustrating an example of measured power spectrum of an occupied frequency band.

Also, the feature extraction component 304, 404 or 504 can measure the bandwidth of the transmission from the FFT by measuring the lowest and highest frequency bin that has signal power. FIG. 8 specifically illustrates that the feature extraction component 304, 404 or 504 performs an analog to digital conversion 800 and provides an FFT output 802 that is shown graphically as 804. The feature extraction component 304, 404 or 504 can thus measure the bandwidth of the transmission from the FFT by measuring the lowest and highest frequency bin that has signal power, which is the occupied frequency 806 as indicated. This bandwidth feature is passed to the classifier 306, 406 or 506. The existence of a known transmission's preamble be directly measured and sent as a single bit feature to the classifier 306, 406 or 506. The interval of the noise floor changes can be used to measure the activity of unknown transmissions. The period and approximate bandwidth also can be sent to the classifier 306, 406 or 506.

Classifier

The classifier 306, 406 or 506 determines the type of the detected signal based on features of the signal. The classifier 306, 406 or 506 may be tree classifier, Bayesian classifier or any other type of classifier, such as a nearest-neighbor classifier or k-means classifier, as known in the art. The classifier 306, 406 or 506 can also be self-learning. The classifier associates a class of a signal with a feature vector. The class may be the type of signal detected, for example, a signal complying with the IEEE 802.11 Standard, or a Bluetooth signal, for example. The classifier 306, 406 or 506 acquires the feature vector from the feature extractor 304, 404 or 504. For example, a vector contains information regarding the bandwidth, the power level, the periodicity, and whether any 802.11 preambles were detected. For example, if the bandwidth is one (1) megahertz MHz and no IEEE 802.11 preambles were detected, this information can be interpreted by the classifier 306, 406 or 506 as indicating that the transmission is a cordless phone signal, for example, or that this is a signal transmitted by some meter reading equipment.

The classifier 306, 406 or 506 can also be a self-learning classifier, such as a classifier 306, 406 or 506 running a "K-means algorithm", for example, that can "learn". As understood in the art, a K-means algorithm is a type of non-hierarchical clustering algorithm that clusters objects based on attributes into k partitions or clusters. The algorithm converges when the means do not change anymore. Other possibilities include the sequential k-means algorithm which allows the data points to be added during the operation of the transceiver 108, that is, the transceiver 108 of the node 102, 106 or 107 learns the environment while it is operating.

The K-means algorithm is described as follows. In this example, it is assumed that there are n feature vectors $X_1$, $X_2$, ..., $X_n$ all belonging to the same class C, and they belong to k clusters such that k<n. If the clusters are well separated, a minimum distance classifier can be used to separate them. The algorithm first initializes the means $\mu_1$ ... $\mu_k$ of the k clusters. One of the ways to do this is just to assign random numbers to them. The algorithm then determines the membership of each X by taking the $\|X-\mu_i\|$. The minimum distance determines X's membership in a respective cluster. This is done for all n feature vectors. An example of code for the actual algorithm is set forth below. However, the algorithm is not limited to this code and can be implemented by any suitable software and/or hardware as can be appreciated by one skilled in the art.

```
1.  begin
2.      initialize n; c; μ_1 ... μ_c
3.      do
4.          classify n samples according to nearest μ_i
5.          recompute μ_i
6.      until no change in μ_i
7.      return μ_1 ... μ_c
8.  end
```

The clustering algorithm creates clusters in N-dimensional space where N is the length of the feature vector. After the clustering algorithm has converged, the communication device can verify the meaning of the clusters by informing the user of unknown clusters. For example, some of the clusters may have been labeled by the manufacturer to be some type of known system, but if new clusters are found, such a finding would signal the existence of systems that are not known by the cognitive communication device.

Higher Layer Decision Making

Figure 9:
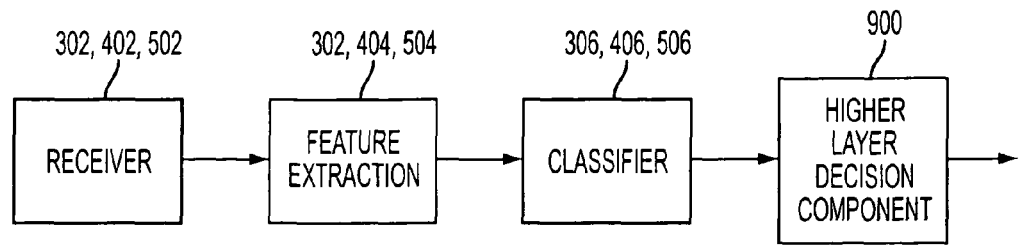
FIG. 9 is a block diagram illustrating a signal classifier system including a higher layer of decision making, in accordance with an embodiment of the present invention.

As can further be appreciated by one skilled in the art and as shown in FIG. 9, each signal classifier system 300, 400 or 500 that employs a receiver 302, 402 or 502, feature extraction component 304, 404 or 504, and a classifier 306, 406 or 506, can further employ a higher layer decision making component 900. The higher layer component 900 contains rules for unknown clusters, thus indicating how the classifier system 300, 400 or 500 or the node 102, 106 or 107 employing the classifier system 300, 400 or 500 should operate when there are unidentified transmissions. Such rules may indicate that the classifier 306, 406 or 506 should stop operations immediately, lower its reception and/or transmission power, send the data set to the controller 112, for example, for analysis and further action, or alert the operator of the node (e.g., node 102) of the unidentified transmission, and so on.

The operator of the node 102 or other suitable personnel may be able to enter information to instruct the node 102 about the proper action for the new unknown signal, for example, by changing the higher layer rules, by adding a rule indicating that transmit power should be limited, by adding a rule that unknown signals are to be ignored, and so on. From this point on, the node 102 will know how to handle the located unidentified signal.

As can be appreciated by one skilled in the art, the actual clustering algorithm need not be a k-means algorithm, but can be any other suitable clustering algorithm. Also, the higher layer decision making system may not need to be a tree-based classifier (rule-based), but can be another type of clustering algorithm. By having the higher layer be another clustering algorithm, an additional benefit can be attained that allow the signal classifier system 300, 400 or 500 to find the closest cluster with a known action and classify the new situation accordingly. For example, if new and unfamiliar modulation is added to some public standard, for example IEEE Standard 802.x, (where x can be 11a, 11b, 11g, and so on, and variations thereof), then the signal classifier system 300, 400 or 500 can classify any signal that has an IEEE Standard 802.x header and similar spectrum, for example, to be classified as an IEEE Standard 802.x signal.

The modulation method used may depend on the results of the higher layer classifier. For example, if the node 102, 106 or 107 wants to reserve the channel in the presence of IEEE Standard 802.11 signals; the node can do that by sending a proper preamble and then non-compatible signals. This generally can be done at times when severe interference exists from IEEE Standard 802.11 signals. This can be identified by the classification system described above. Additionally, the existence of frequency hopping cordless devices, such as telephones, can be identified and the proper action may be to add error coder capacity or to identify the bandwidth of the frequency hopper, and then change the error correction coding or frequency band selection accordingly. This operation can now depend on whether the other system is operating at the moment, and may depend on the location of the mobile cognitive communication device (e.g., cordless device).

Distributed System

Figure 10:
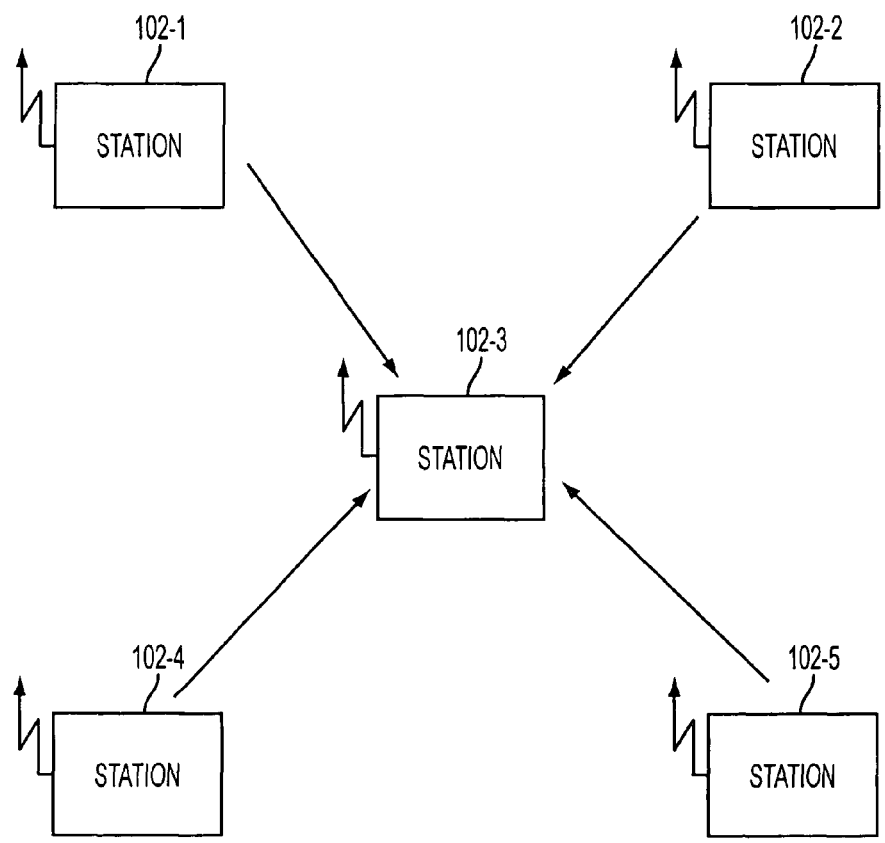
FIG. 10 is a block diagram of an example of a centralized cognitive communication device network employing the features of the network shown in FIG. 1 in accordance with an embodiment of the present invention.

As discussed above, the above-described signal classifier system 300, 400 or 500 can be distributed in a multi-hop network, such as network 100. For example, as shown in FIG. 10, each node (e.g., nodes 102-1 though 102-2) operates as described above, but additionally sends all the feature vectors or the cluster parameters to centralized station (e.g., a particular node 102-5) that creates a new classifier based on a clustering algorithm as discussed above. Additionally, the algorithm may contain the locations of reported feature vectors. Therefore, the locations and types of interferers can be automatically detected and multi-hop network 100 can then coordinate the transmission and modulation around those areas based on location information.

Figure 11:
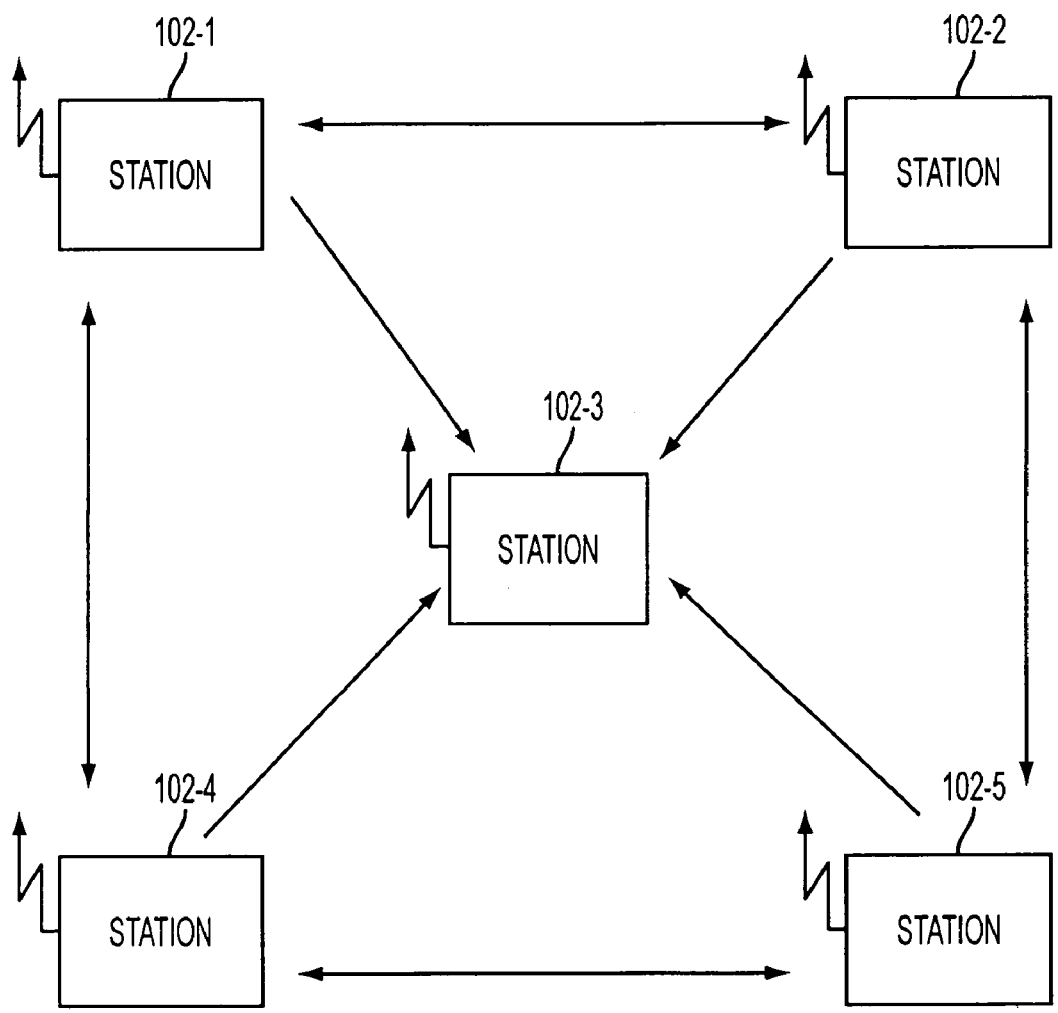
FIG. 11 is a block diagram of an example of a distributed cognitive communication device network employing a central node and the features of the network shown in FIG. 1 in accordance with an embodiment of the present invention.

An additional approach is that each node (e.g., nodes 102-1 through 102 informs its neighbor nodes about its respective feature vectors by broadcasting the vectors. This way, a local map with location of reception being one feature can be created as shown in FIG. 11.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for performing distributed signal classification within a wireless multi-hop communication network, the method comprising:
operating each of a plurality of multi-hop nodes within the wireless multi-hop communication network to:
receive at least one respective signal and acquire a sample of the signal;
extract at least one feature of the signal from the sample;
assign a feature vector to the signal based on the at least one feature;
classify the signal the signal as a certain type of signal based on the at least one feature;
change an operation of the multi-hop node based on the signal classification; and
transmit the feature vector including the signal type to other multi-hop nodes in the wireless multi-hopping communication network.

2. A method as claimed in claim 1, further comprising:
operating each of the plurality of multi-hop nodes in the wireless multi-hop communication network to receive at least one respective signal and acquire a sample of the signal;
operating each of the multi-hop nodes to extract at least one feature of the signal from the sample;
operating each of the multi-hop nodes to classify the signal as a certain type of signal based on the at least one feature;
operating each of the multi-hop nodes to assign a feature vector to the signal based on the at least one feature;
operating each of the multi-hop nodes to change an operation of the multi-hop node based on the signal classification; and
operating each of the multi-hop nodes to transmit to each of the other multi-hop nodes the feature vector including the signal type.

3. A method as claimed in claim 1, further comprising:
operating each of the multi-hop nodes to transmit to a single multi-hop node respective information pertaining to the respective types of classified signals.

4. A method as claimed in claim 1, wherein:
the acquiring step comprises operating the multi-hop node to receive a plurality of signals and to acquire a respective sample of each of the plurality of signals;
the extracting step comprises operating the multi-hop node to extract at least one respective feature of each of the signals from their respective sample; and
the classifying step comprises operating the multi-hop node to classify each of the respective signals as one of a plurality of types of signals based on the respective features.

5. A method as claimed in claim 1, wherein:
the sample is a digital sample; and
the extracting step comprises operating the multi-hop node to perform a Fourier transform operation on the digital sample to extract the at least one feature.

6. A method as claimed in claim 1, wherein extracting at least one feature of the signal from the sample includes measuring at least one of: a Fourier transform of the signal, an average signal power of the signal, and one or more Media Access Control (MAC) headers of the signal.

7. A method as claimed in claim 1, wherein classifying the signal as a certain type of signal comprises classifying the received signal as an IEEE standard 802.x signal, a Bluetooth signal, or an unknown signal.

8. A method as claimed in claim 7, further comprising operating the node to analyze the received signal or ignore the received signal based on a higher layer rule, when the signal is classified as an unknown signal.

9. The method as claimed in claim 1, further comprising:
operating a next hop node within the communication network to:
receive the feature vector including the signal type;
receive the signal and acquire a sample of the signal;
extract at least one feature of the signal from the sample;
assign a feature vector to the signal based on the at least one feature;
classify the signal the signal as a certain type of signal based on the at least one feature;
change an operation of the next hop node based on the signal classification; and transmit the feature vector including the signal type to other multi-hop nodes in the wireless multi-hopping communication network.

10. A method as claimed in claim 1, wherein the signal is one of a known signal and an unknown signal.

11. A method as claimed in claim 10, further comprises:
transmitting the unknown signal with a preamble, wherein the preamble is based on the at least one feature of the signal.

12. A node, operating in a wireless multi-hop communication network having a plurality of nodes, the node comprising:
a receiver, for receiving at least one signal and acquire a sample of the signal;
a feature extractor, for extracting at least one feature of the signal from the sample;
a classifier, for classifying the signal as a certain type of signal based on the at least one feature and for assigning a feature vector to the signal based on the at least one feature;
a decision component, for instructing the node to change an operation of the node based on the signal classification; and
a transmitter, for transmitting to each of the other nodes, the feature vector including the signal type.

13. A node as claimed in claim 12, wherein:
the receiver for receiving a plurality of signals and to acquire a respective sample of each of the plurality of signals;
the extractor for extracting at least one respective feature of each of the signals from their respective sample; and
the classifier for classifying each of the respective signals as one of a plurality of types of signals based on the respective features.

14. A node as claimed in claim 12, wherein:
the sample is a digital sample; and
the extractor for performing a Fourier transform operation on the digital sample to extract the at least one feature.

15. A node as claimed in claim 12, further comprising:
a demodulator, for demodulating the signal based on the at least one feature.

16. A node as claimed in claim 12, wherein:
the receiver comprises a plurality of receivers, for monitoring different frequency bands for receipt of a signal.

17. A node as claimed in claim 12, wherein:
the decision component determines an operation of the node based on the type of signal as classified by the classifier.

18. A wireless communication network, comprising:
a plurality of nodes, each of the plurality of nodes comprising a receiver, for receiving at least one signal and acquire a sample of the signal, a feature extractor, for extracting at least one feature of the signal from the sample, a classifier, for classifying the signal as a certain type of signal based on the at least one feature and for assigning a feature vector to the signal based on the at least one feature, a decision component, for instructing the node to change an operation of the node based on the signal classification, and a transmitter, for transmitting to other nodes the feature vector including the signal type.

19. A wireless communication network as claimed in claim 18, wherein:
at least one of the nodes is an access point, for providing at least one of the other nodes with access to a network other than the wireless communication network; and
at least one of the nodes is a wireless router, for routing data packets between other of the nodes in the network.

20. A wireless communication network as claimed in claim 18, wherein:
each of the nodes for transmitting to other nodes respective information pertaining to the respective type of classified signal that the node received and classified.

21. A wireless communication network as claimed in claim 18, wherein:
each of the nodes to transmit to a single one of the nodes respective information pertaining to the respective type of classified signal that node received and classified.

22. A node as claimed in claim 12, wherein the signal is one of a known signal and an unknown signal.

23. A node as claimed in claim 12, wherein:
the transmitter, transmits the unknown signal with a preamble, wherein the preamble is based on the at least one feature of the signal.

* * * * *